May 9, 1967 S. G. KLEIN 3,318,428
METHOD FOR AUTOMATICALLY PREPARING, RECORDING AND
DELIVERING IDENTIFICATION TICKETS
Filed March 23, 1965
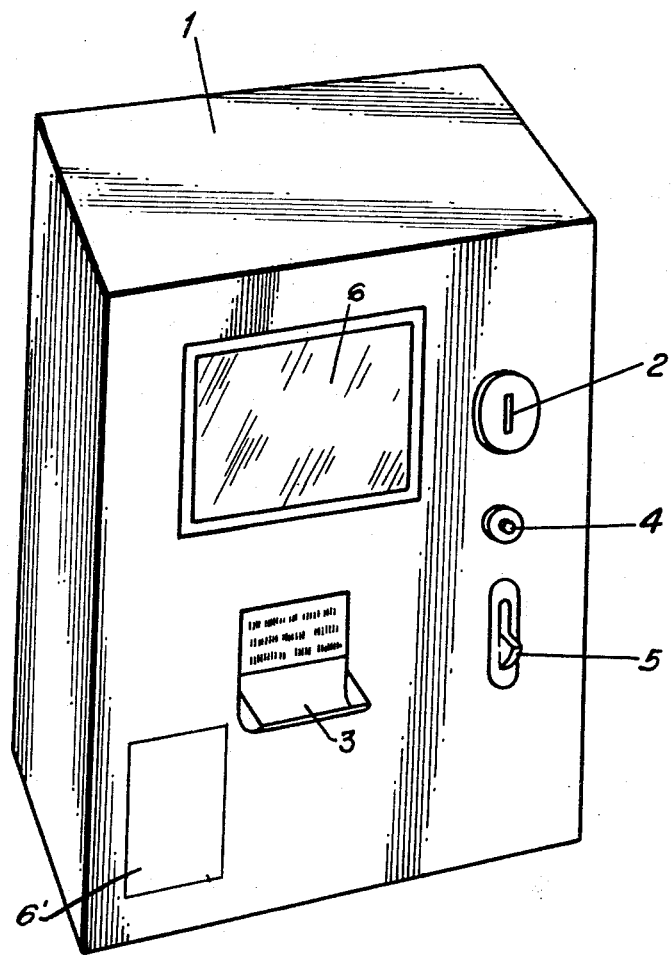
INVENTOR
STEFAN G. KLEIN
BY Lowry & Rinehart
ATTORNEYS United States Patent Office 3,318,428
Patented May 9, 1967

3,318,428
METHOD FOR AUTOMATICALLY PREPARING RECORDING AND DELIVERING IDENTIFICATION TICKETS
Stefan Georg Klein, London, England, assignor to Identymatic Trust, Vaduz, Liechtenstein
Filed Mar. 23, 1965, Ser. No. 442,075
1 Claim. (Cl. 194—2)

The present invention relates to a method for automatically delivering tickets and to an apparatus for carrying out the method.

Certain kinds of tickets are known, which are only valid for a single occasion and are issued only to one certain person, i.e. they are not transferable. Such tickets are provided, for example, for ski lifts, sports meetings, single day and period journey insurance, and tickets which can be drawn at railway stations upon payment of the appropriate fee.

In order to prevent the transfer to another person of a ticket intended only for the personal use of the owner, it was formerly necessary to prescribe the filling in of certain forms, possibly requiring the photograph of the owner of the ticket. The filling in of such forms is much too time-consuming under conditions of crowding and the requirement of submitting a photograph with the filled up form has the effect of inhibiting sales.

The purpose of the present invention is to avoid these disadvantages.

The method for automatically issuing tickets which is the subject of the present invention is characterised by the feature that the insertion of a prescribed amount of money into an automatic apparatus has the effect of initiating and controlling a series of operations which takes place in a definite sequence for the purpose of applying an identifying characteristic both to a ticket which is to be delivered as well as to a record carrier which remains in the automatic apparatus, and also results in the delivery of the ticket provided with the said identifying characteristic.

The apparatus serving to carry out the method is characterised by the fact that it comprises means for the insertion of coins, a supply of tickets to be delivered, means for impressing an identifying characteristic both upon a ticket to be delivered as well as upon a record of the same, ticket delivery means, a money returning button, money returning means, and control and operating means in electrical-mechanical operative connection with each other.

In the performance of the method according to the invention, after the insertion of the prescribed amount of money into the automatic apparatus, there follows the transfer of an identifying characteristic both upon a ticket which is to be delivered as well as upon a reproducible record, for example a copy, which remains in the automatic apparatus. The operations which are initiated and controlled as a result of inserting the amount of money proceed in a definite sequence and, in fact, these are so controlled that the delivery of the ticket only takes place after the money has been inserted in the automatic apparatus and after the transference of the identifying characteristic has taken place which imparts to the ticket a personal quality.

The transference of the identification characteristic on the ticket to be delivered and upon the reproducible record which remains in the automatic apparatus can be effected by arranging that the person, for whom the ticket is destined, makes a finger impression both upon the ticket as well as upon the copy thereof. For such finger impressions it suffices to use a conventional fingerprint tape. Instead of using a finger impression it is possible to use a photograph as an identifying characteristic. This photograph is prepared within the minimum of time by the automatic apparatus in the course of the operations which follow the definite sequence, and such photographs can, in fact, be prepared in duplicate copies, for example, of which one impression is applied to the ticket whilst the other impression remains with the copy of the ticket as a record in the apparatus. Particularly suitable for the rapid recording of the photographs is the camera which is available in commerce under the protected Trade Mark "Polaroid," which operates fully automatically and delivers finished pictures within a few seconds. The film which remains in the apparatus, which can be a so-called micro-film, can itself serve as the reproducible record, so that special means for reproduction of the photograph are not necessary.

In the accompanying drawing there is represented in perspective an apparatus for carrying out the method in accordance with the invention and using such a camera.

The apparatus indicated by the reference 1 has the appearance of a conventional automatic apparatus such as is used, for example, for issuing railway platform tickets and comprises means for the insertion of coins 2, ticket delivery means 3, a money return button 4 and a money return receptacle 5. Additionally the apparatus is provided with a window 6, behind which is situated a camera for taking the photographs. Inside the apparatus there are situated the control and operating means well-known in the art of automatic apparatus, such means being in electric-mechanical operative connection with each other in such a way that the intended sequence of the desired working operations is maintained.

In the drawing there is shown in the lower left corner of the apparatus the aperture 6' for taking finger or thumb impressions. Behind this opening are situated the conventional assemblies of apparatus for dactyloscopy comprising the color carrier, the printing ribbon and the like for taking the impression of finger prints.

It is possible to arrange a plurality of windows 6 or finger openings 6', so that each of these openings serves for the delivery of a certain definite category of tickets, which fix, for example, the period of validity, the points of entry, the amounts prescribed for travel insurance and so on.

By virtue of the method in accordance with the invention and the apparatus adapted for the performance thereof it is now possible to deliver tickets even under conditions of serious congestion without entailing the time-consuming filling up of forms, and such tickets are impossible to transfer to another person on account of the identification characteristic. Managements and insurance institutes have absolute protection against mischievous use of delivered tickets. For travel and insurance offices there is also the further advantage, in particular when photographs are used as the identification characteristic, that if a traffic mishap should take place, for example an aircraft crash, identification is substantially facilitated by the duplicate tickets retained in the ticket issuing apparatus and containing the photographs.

It is also possible to use only numbers for identification purposes, for example to apply numbers directly to the tickets when issuing them and to apply corresponding numbers to a recording strip which remains in the automatic apparatus. The entire operation is thereby considerably simplified, but this particular application is restricted to fields where there can be less stringent precautions against misuse.

For certain cases the preparation of a written copy remaining in the automatic apparatus is not absolutely necessary, and, for the purpose of identification and control of the tickets, it would be appropriate to set into operation a known type of recording mechanism which is adequate for the purposes of a reproducible record.

The numbers which are used for identification purposes may be prepared in advance for application to the tickets and films which are used. The tickets with the photographs or finger impressions for identification purposes can be prepared partly or wholly of known types of reproduction paper.

The operation of the described apparatus may be effected by purely mechanical means, whether it be by push buttons, drawers, cranks and so on, and naturally can also be effected wholly or partly by electrical means in a similar manner to the automatic goods dispensers which are set into operation by the insertion of a coin.

While the invention has been described in detail with respect to a now preferred example and embodiment of the invention it will be understood by those skilled in the art after understanding the invention, that various changes and modificaions may be made without departing from the spirit and scope of the invention and it is intended, therefore, to cover all such changes and modifications in the appended claim.

Having thus described my invention, I claim as new and desire to secure by Letters Patent:

In a method for automatically preparing, recording and delivering identification tickets from an issuing machine, wherein upon insertion of a prescribed amount of money into said machine, operations are initiated and controlled in a definite sequence, the steps of (a) bringing for access before the person to whom said ticket is to be issued from said machine both said ticket which is to be issued and a duplicate record thereof which is retained within the machine;

(b) receiving positive, color-impressed finger prints of said person, said prints being made with the same fingerprinted color material, and identical prints being placed separately on said ticket and said record; and (c) issuing said finger-printed ticket to said person while simultaneously, within said machine, rendering said duplicate finger printed record inaccessible to said person.

References Cited by the Examiner

UNITED STATES PATENTS

| | | | |
|---|---|---|---|
| 2,215,004 | 9/1940 | Knox. | |
| 2,765,717 | 10/1956 | Simjian. | |
| 2,830,512 | 4/1958 | Nagel | 346—107 |
| 2,909,107 | 10/1959 | Simjian | 194—10 X |
| 3,018,869 | 1/1962 | Cozart | 194—10 |

ROBERT B. REEVES, *Primary Examiner.*

STANLEY H. TOLLBERG, *Examiner.*